Patented Dec. 20, 1938

2,140,561

UNITED STATES PATENT OFFICE 2,140,561

UREA-FORMALDEHYDE CONDENSATION PRODUCTS

Leonard Smidth, New York, N. Y.

No Drawing. Application August 10, 1933, Serial No. 684,561

17 Claims. (Cl. 260—3)

This invention relates to the reaction products of urea or equivalent substances with formaldehyde or equivalent substances. It relates particularly to those products which may be cast, molded or machined or otherwise treated to make shaped articles and also to varnishes, lacquers, paints and enamels containing such synthetic products.

According to the prior art the reaction between urea and formaldehyde can be roughly divided into three stages, the condensation stage, the polymerization stage, and the hardening stage. (See Ripper U. S. Pat. No. 1,687,312, page 1, line 3.) The condensation stage is usually completed after a comparatively short reaction of urea and formaldehyde, either boiling of the reactants or use of a lower temperature for a correspondingly longer time. Prior workers have shown that the polymerization stage is usually a prolonged one and is usually conducted by boiling. The viscosity gradually rises as boiling is continued until the product does not become cloudy on cooling. For the manufacture of glass-like materials the product is then vacuum distilled so as to remove as much water as possible before being cast. The hardening stage is the one in which the casting liquid is changed in the mold into the final infusible insoluble material. This is accomplished by heating either with or without pressure.

In copending application No. 429,202, filed Feb. 17, 1930, I show how to make a superior urea formaldehyde molding composition by reacting urea and formaldehyde so as not to carry it beyond the condensation stage and then simultaneously carrying on the reaction and drying. This is done by reacting urea and formaldehyde at a low temperature in the presence of potentially acid substances and removing water that is present or formed at a low temperature simultaneously with the reaction. The final polymerization or hardening stage is carried out at a higher temperature in the substantial absence of water partly by blowing heated air through the composition but mostly during the molding under heat and pressure.

Application No. 429,202 is set forth.

I have discovered a method whereby a uniform condensation product of great strength and durability may be obtained in a very simple way, which method consists in producing a molding composition by reacting urea and formaldehyde at a controlled temperature below 100° C. in the presence of substances which will hydrolyze in solution or react with the free formaldehyde to yield free hydrogen ions. These substances may be ammonia; ammonium salts; salts which hydrolyze in solution to yield free hydrogen ions, such as zinc chloride; water soluble esters, such as methyl formate; and organic compounds, such as formamide.

Commercial formaldehyde usually contains acidic material, mostly formic acid, in sufficient quantity to establish a concentration of hydrogen ion of pH 3. This concentration of acidic catalyst is sufficiently high to carry the reaction so rapidly that the product is of little value. Ammonia is therefore added to reduce the acidity from the concentration of pH 3 to between pH 4 and pH 7.5. Now I have found that no apparent change occurs if formaldehyde with added ammonia remains at normal temperature. However, above 40° C. a reaction occurs, the rate of which increases with increase of temperature. The hydrogen ion concentration is observed to change slowly at first, then rapidly, and then more slowly. The rate of change depends on the temperature and the hydrogen ion concentration of the original formaldehyde ammonia solution. The same phenomena were observed when the formaldehyde ammonia solution contained the proper amount of urea desired for the condensation. It is believed that the ammonia reacts with free formaldehyde with the formation of hexamethylenetetramine and the consequent liberation of the original formic acid, thus increasing the hydrogen ion concentration. This increasing catalyst hydrogen ion accelerates the formation of the final products with the consequent liberation of formaldehyde. The formaldehyde thus produced reacts with any ammonia or urea that might be present. The control of the temperature of this reacting mixture makes possible a great improvement in the process and in the quality and uniformity of the molding composition.

I have made a urea formaldehyde mixture in the mole ratio of 1.25 and 2 respectively with ammonia or other bases added to bring the hydrogen ion concentration of the solution to pH 6.5 and have held this solution at about 30° C. for about thirty minutes. It was then mixed with paper or other filler and subjected at once to a stream of dry air for some hours at normal temperature. When sufficient water is removed the material can be heated to a higher temperature until dry. I have found that material so produced is uniform in its properties.

When other substances than ammonia or ammonium salts are used to give free hydrogen ions and thus catalyze the reaction, the original acidity of the formaldehyde solution can be reduced by the use of sodium hydroxide or other alkalis.

The composition is finally subjected in the mold to the action of heat and pressure. The high temperature, say between 125° C. and 180° C. continues the process that was retarded by the low temperature of the preparation process described (with the formation of hexamethylenetetramine and consequently rapid increase in the amount of acid catalyst present). Hence, an initial good flow is obtained. In case a salt of ammonia and a stronger acid than formic acid such as HCl is added, with the proper adjustment of the hydrogen ion as described above to give satisfactory hydrogen ion concentration as before, i. e., between pH4 and pH7.5, then the formation of hexamethylenetetramine results in the liberation of the stronger acid and the consequent more rapid increase in hydrogen ion results in a shorter curing time.

The above procedure yields a uniform product that is high in final infusible insoluble material and low in free formaldehyde both of which are factors that determine the strength and the resistance to water absorption.

The essence of the above and the present invention is that the reaction is not carried beyond the condensation stage before the water is begun to be taken off, and proceeds in such a manner that as much of the water present or formed is removed as soon as possible either before or during the reaction and drying process. A potentially acidic substance is used so as to keep the initial pH value sufficiently high so that the product will remain clear, and yet furnish additional acid to speed up the polymerization and hardening stage. During the condensation period I have shown in my U. S. Patent #1,893,911 and in application #429,202 that a pH value above 4 must be used in order to obtain a clear transparent product. Otherwise if reacting solution has a pH value of less than 4 the product will be milky or cloudy. This is because with such a pH value the reaction will proceed so fast that a proper time is not allowed for the formation of a colloidal solution, instead the product will tend to precipitate and will form a cloudy solution. Instead of using a potentially acidic substance the condensation can be carried out in either acid, neutral or basic medium just so that the pH value is above 4, and after the condensation either preferably adding an acid catalyst (acids, acidic salts, and acidic substances) or else keeping the polymerization stage on the acid side.

In preparing condensation products of urea and formaldehyde, the reaction stage is comparatively short. Instead of using a low temperature (30° C.) for a comparative longer time as is done in the above specification, it is obvious that the same results can be attained by using a higher temperature for the reaction; the higher the temperature the shorter will be the time. In my U. S. Patent #1,893,911 I show that the reaction state is probably represented by the formation of dimethylol urea. This is obtained by boiling the urea and formaldehyde for a few minutes. Anyhow the first or condensation stage can be eliminated if instead of starting with urea and formaldehyde, dimethylol urea is used. It can be reacted and the water taken off as it is formed in the presence of an acid catalyst, with or without additional urea being added to react with the formaldehyde as it is formed to give improved products.

It is very important that the proper amount of acids be used during the second or polymerization stage of the reaction. For some purposes such as the preparation of glass-like materials, it is desirable to have as much acid present during the polymerization as possible because the greater the amount present the quicker will be polymerization and hardening stages. However, if a stable intermediate product which must be kept for some time is desired, too much of an acid catalyst cannot be left in the final product. For example, molding compositions must be prepared so that the reaction will not appreciably continue during storage or transit so that the composition will not lose its original plasticity. Again it is desirable to have stable solutions for use as lacquers or cements which must keep for long periods of time without gelatinizing. In both of the above cases it is desirable to have the pH on the acid side but as near the neutral point as possible say pH 6.5. If a larger amount of acid catalyst is present it must be neutralized to give such a pH value.

After the initial reaction and during the drying it is essential that as little water as possible is present; otherwise if a large amount of acid is present it will have a tendency to cause premature gelatinization. In the absence of water the composition is rendered less sensitive to the action of heat even though a comparatively large amount of acid catalyst is present. It is a purpose of this invention to have as little water present as possible during the polymerization stage so that instead of gelatinizing, the product will more or less solidify substantially without any or with very little water. The presence of acid substances or catalysts aid in the polymerization and splitting off of water. If there is too much catalyst present the condensation product will gelatinize before all the water is removed, while if the solution is not sufficiently acid the final product obtained will be cloudy or milky. Therefore if the right conditions are obtained the final product, without fillers, will be clear and transparent. For some applications an absolutely clear product is not necessary so that if approximate conditions herein set forth are observed the final material may be milky but of superior physical properties. Ammonium salts are particularly useful for carrying out the invention because they tend to keep the solution first at a high pH value during the condensation, then become the more acid on heating, such acidity being just the right rate so that a clear transparent final product can be prepared with ease.

In my U. S. Patent No. 1,893,911 I show how to obtain a clear transparent product by adding urea in a proportion greater than 1.1 moles of urea to 2 moles of formaldehyde. In copending application No. 664,208, I show how to prepare molding compositions by reacting more than 1.05 moles of urea to 2 moles of formaldehyde and use this material to impregnate cellulose compounds. In carrying out this invention it is preferable to use a proportion of greater than 1.05 moles of urea to 2 moles of formaldehyde. Although it is easier to obtain clear transparent products by the use of lower proportions of urea than correspond to 1.05 moles of urea to 2 moles of formaldehyde, the final products will not be as chemically resistant nor as strong. It is possible, however, to start with smaller proportion of urea and use conditions of reaction and drying under which the excess formaldehyde would be driven off. Such conditions would for example be attained in which the vacuum distillation is carried out by using a high temperature in the bath and a moderately high vacuum. Such a vacuum method is a convenient way of carrying out the present invention. By using the method outlined in the present application, it is possible to use a ratio of 1.5 moles of urea with 1 mole for formaldehyde and obtain a clear transparent product.

The difference between this invention and prior ones is that in the prior ones the polymerization or second stage is carried out by boiling or reacting the condensation product before the water is removed, whereas in the present invention as much of the solvent water and that formed by reaction is taken off as soon as possible before or during the reaction and drying process. One method of removing the water from the product prepared according to the above specification is to blow air through the condensation product first at a normal temperature so as to substantially dry it, then heating the air blown through in order to complete the drying operation. This phase of my invention is set forth in my copending application #422,545 filed Jan. 22, 1930.

Molded compositions such as those prepared in accordance with prior practice from urea and formaldehyde are commonly molded under heat and pressure in the absence of an acid catalyst. A convenient method is to have the acid catalyst present during the initial reaction between the urea and formaldehyde. The solution before "setting" is used to impregnate suitable material, such as paper, cotton, or asbestos or it has introduced therein solid material in broken form such, for instance, as pearl shell chips or flakes. The composition is then commonly dried with the aid of heat and where the impregnated paper, cotton, asbestos or the like is used, the composition is usually ground into a fine powder before being placed in the mold.

The composition, if properly prepared, will flow or take the shape of the mold when subjected to the combined action of heat and pressure. After the proper "curing" in the mold it should be possible to remove the molded article in a rigid and fully "cured" condition. The acid catalysts are used in the composition in the effort to affect the proper "curing" of the composition in the mold.

When the composition is subjected to the action of heat for drying it, the presence of the acid catalyst makes it extremely difficult to control the uniformity of the composition for the reason that the acid catalyst causes the composition to become "hard", i. e., which will not freely "flow" or take the shape of the mold when the composition is subjected to the combined action of heat and pressure therein. The reason for this is that the reaction which makes the composition hard and infusible in the mold has been partly taking place during the drying operation, above described.

I have discovered that a superior molding composition can be obtained by partially drying a catalyst containing urea formaldehyde product in the presence of a suitable "support", as for instance, any of the materials hereinbefore mentioned, at a normal temperature and thereafter heating the composition to complete the drying operation. By this partial drying operation before the heat is applied, the amount of water in the composition is materially decreased and the composition is thus rendered less sensitive to the action of heat during the drying operation even though a comparatively large amount of acid catalyst is present.

In practice, I take the acid catalyst containing urea formaldehyde condensation product in the presence of the desired "support" such, for instance, as paper, cotton, asbestos or any broken solid material as pearl shell chips or flakes, and subject the same to the action of a blast of air or other inert gas at a normal temperature, say, below 50° C. by passing the air or other inert gas over or through the composition until the composition is partially dried. I thereafter subject the partially dried composition to the action of heat to complete the drying operation.

The great improvement which I have noted in the composition by utilizing the step of partially drying the composition at a normal temperature and thereafter heating the composition to complete the drying operation may arise either from the elimination of deleterious compounds from the composition by the air or other inert gas, or by the formation of helpful compounds because of the introduction of the air or other inert gas, at a normal temperature.

Obviously a convenient method of blowing air through the composition is to spread it on a screen or a sieve. It is advantageous to have some means of controlling the humidity of the air used in order to insure uniformity. Some means should also be provided for heating the air and it is advantageous to circulate at least some of the heated air so a minimum of heat is required. Of course, the larger the volume of air or the thinner the material is spread on the screen or sieve, the shorter will be the drying time.

A detailed example of carrying out the above invention is given below.

100 lbs. of urea were dissolved in 218 lbs. of commercial formalin solution containing 38% of weight of formaldehyde. After all the urea was added the temperature dropped to 6° C. Sufficient ammonium hydroxide was then added to give the mixture a pH value of 6.5. After bringing the temperature to 30° C. it was maintained there by cooling for one-half hour. The solution was then mixed or shredded with 80 lbs. of sheeted Alpha fibre (an absorbent and loosely compressed form of paper containing a high proportion of Alpha cellulose) until the sheets were broken down. The wet fibrous material was placed uniformly on a 10 mesh Monel metal screen fitted in a dryer so that a large volume of air was forced through the screen and the material. The screen was approximately 75 by 70 inches and the volume of air blown through was roughly 2,000 cubic feet a minute. The dryer was arranged with an outlet, so that all or little of the air could be re-circulated. At first air was blown through the material with the vent kept open so that little of the air would be re-circulated. Thus fresh dry air was blown over the material for some hours until nearly dry. Then heat was applied to the coils through which the air passed, and as the drying proceeded the vents were partially closed. The temperature recorded in the material varied from 30° C. at the start until it reached as high as 50–60° C. at the finish. Care had to be taken that the material would not get too stiff so that it could not be properly molded or that the material was sufficiently dry so that it could be properly ground without "gumming up" the mill. The pH of distilled water extract of the final material was found to be approximately 6.5. Due to the presence of some material which rapidly decomposed in the presence of water the pH value rapidly went to a pH of roughly 8.0.

The method of taking the pH of the molding powder composition is as follows: 5 grams of the molding composition were mixed with 10 cc. of distilled water, filtered as quickly as possible and a few drops of Brom Thymol Blue added to the filtrate. One minute after pouring into the filter the filtrate gave a color showing the pH was 6.5; upon standing the pH increases to 7.7 and above after ten minutes.

Other methods of drying include vacuum, drum, or spray drying. Since drying and polymerization must proceed simultaneously, the method of drying will determine the amount of catalyst which should be used. Vacuum drying is a much faster process than drying at atmospheric pressure or at ordinary temperatures, so that therefore a greater amount of catalyst should be used. Spray drying is a still faster method and thus a still greater amount of catalyst can be used.

Instead of urea, thiourea or substitution products of urea or of thiourea or substance from which urea or thiourea can be prepared, may be used in so far as they are not specifically limited, all of which I wish to be included along with urea in the designation "urea" used in the following claims. Such substances are guanidin, cyanamid, dicyandiamid, ammonium thiocyanate and ammonium cyanate. The formaldehyde may be used either in the commercial aqueous solution or in the gaseous state or in the form of a solution of anhydrous formaldehyde or in the form of the polymers.

Before conversion into the solid condition there can be incorporated in the mass filling materials of fibrous, pulverulent or liquid character, or agents conferring elasticity or coloring matters.

Because of the absence of any appreciable amounts of water in the product before being converted into the solid condition, many plasticizers or modifying agents are soluble in it. The advantages of using such a water-free material, either with or without plastifiers or modifying agents is set forth in my copending application No. 664,207 filed April 3, 1933. In this prior application I disclose a method of removing water from an acid condensation product of urea and formaldehyde at a low temperature in such manner that the reaction will not progress too far before the water is removed. By this partial drying operation, that is by blowing air at ordinary temperatures to partially dry the mass before heat is applied, the amount of water in the composition is materially decreased and the composition thus rendered less sensitive to the action of heat during the drying operation even though a comparatively large amount of an acid catalyst is present.

Thus while I have described my improvement in detail and with respect to certain preferred forms, I do not desire to be limited to such details or forms since, as will be noticed by those skilled in the art, after understanding my invention many changes and modifications may be made and the invention embodied in widely different forms without departing from the spirit and scope thereof in its broader aspects, and I desire to cover all modifications, forms and improvements coming within the scope of any one or more of the appended claims.

This application is a continuation in part of applications Serial Nos. 422,545, Jan. 22, 1930; 429,202, filed Feb. 17, 1930; 664,207, April 3, 1933; 664,208, April 3, 1933.

In my application Serial No. 664,207 I disclose principally a method of increasing the flow of urea-formaldehyde molding compositions involving the introduction of a solution of urea in formaldehyde which may have been previously reacted or not into urea-formaldehyde molding powders. The molding compositions produced in accordance with the present invention may be treated in the manner of the compositions of the prior application.

Having thus described my invention what I claim as new and desire to secure by Letters Patent is:

1. In the process of manufacturing urea formaldehyde condensation products, the steps which consists in reacting urea and formaldehyde in solution at least to the methylol urea stage but not until substantial polymerization begins, then removing as much solvent as possible and continuing the reaction and drying simultaneously in the presence of an acid substance, thereby producing a fusible mass, suitable for casting, molding and the like.

2. In the process of manufacturing urea formaldehyde condensation products, the steps which consist in reacting urea and formaldehyde in solution no further than the formation of a methylol urea said form formaldehyde as such being completely reacted, and then before any appreciable polymerization begins removing as much solvent as possible and continuing the reaction and drying simultaneously in the presence of an acid substance, thereby producing a fusible product.

3. In the process of manufacturing urea formaldehyde condensation products, the steps which consist in reacting urea and formaldehyde in solution at least to the methylol urea stage but before there is a substantial change in the viscosity of the solution, removing as much solvent as possible and continuing the reaction and drying simultaneously in the presence of an acid substance, thereby producing a fusible product.

4. In the process of manufacturing urea formaldehyde condensation products, the steps which consist in removing as much solvent as possible from a reaction product of urea and formaldehyde in solution reacted at least to the methylol urea stage but not until appreciable polymerization occurs, then simultaneously continuing the reaction and drying in the presence of an acid substance, thereby producing a fusible product.

5. In the process of manufacturing urea formaldehyde condensation products from a solution of the initial reaction products of urea and formaldehyde from which as much solvent as possible has been removed, the steps which consists in simultaneously continuing the reaction and drying process in the presence of an acid substance thereby producing a fusible product, the solution of said initial reaction product being substantially free of formaldehyde as such and free of gelatinous polymerization products.

6. In the process of manufacturing urea formaldehyde molding compositions, the steps which comprise drying a methylol urea condensation product of urea and an aqueous solution of formaldehyde, the said condensation product before drying not having been reacted to the point where there is a substantial change in the viscosity of the solution, then simultaneously drying and continuing the reaction in the presence of an acid and in the presence of as little water as practicable, thereby producing a fusible molding composition.

7. In the process of manufacturing urea formaldehyde molding compositions, the steps which comprise mixing a methylol condensation product of urea and an aqueous solution of formaldehyde having a pH value above 4, the said condensation product before drying is commenced not having been reacted to the point where there is a substantial change in the viscosity of the solution, mixing a filler with the solution, then simultaneously drying and continuing the reaction in the presence of an acid and in the presence of as little water as practicable, thereby producing a fusible molding composition.

8. In the process of manufacturing urea formaldehyde molding compositions, the steps which comprise mixing the primary reaction product of from more than 1.05 moles of urea and 2 moles of aqueous formaldehyde with a filler, the primary reaction product before mixing having been reacted at least until methylol urea is formed but not having been reacted to the point where there is a substantial change in the viscosity of the solution, then simultaneously continuing the reaction and the drying, thereby producing a fusible molding composition.

9. In the process of manufacturing urea formaldehyde molding compositions, the steps which comprise mixing the primary reaction product of urea and an aqueous solution of formaldehyde with a cellulose filler, the primary reaction product before drying having been reacted at a low temperature at least until methylol urea is formed but not so far that the viscosity of the solution is substantially changed, then simultaneously drying and continuing the reaction in the presence of an acid substance and in the presence of as little water as practicable, thereby producing a fusible molding composition.

10. In the process of manufacturing urea formaldehyde molding compositions, the steps which comprise drying the primary reaction product of urea and an aqueous solution of formaldehyde with a filler, the primary reaction product before drying having been reacted at least until methylol urea is substantially formed but not having been reacted to the point where there is a substantial change in the viscosity of the solution, then simultaneously continuing the reaction and the drying, thereby producing a fusible molding composition.

11. The method of preparing a urea formaldehyde molding composition which consists in blowing unheated air through a suitable filler containing a low viscosity solution of an unpolymerized methylol urea condensation product having an acid catalyst therein, such mixture forming a porous mass permitting the passage of a gas during the drying process, to partially dry the composition and thereafter heating the air blown through the composition in order to complete the drying operation.

12. The method of preparing a urea formaldehyde molding composition which consists in blowing air at a temperature below 50° C. through a condensation product free of any polymerization product which has been reacted at least to the methylol urea stage mixed with a suitable filler, such mixture forming a porous mass permitting the passage of a gas during the drying process, to partially dry the composition and thereafter heating the air blown through the composition in order to complete the drying operation.

13. The method of drying to produce a urea formaldehyde molding composition which consists in blowing air through a sieve upon which is placed a solution of a urea-formaldehyde condensate free of any polymerization product thereof mixed with a suitable filler, such mixture forming a porous mass permitting the passage of a gas during the drying process, to partially dry the composition and thereafter blowing air at a higher temperature through the composition in order to complete the drying operation.

14. The method of drying to produce a urea formaldehyde molding composition which consists in blowing air or other inert gas through a solution of a urea-formaldehyde condensate free of any polymerization product thereof mixed with supporting substances, such substances acting both to form a porous material permitting the passage of a gas during the drying process and also acting as a suitable filler for the molded product.

15. The method of drying to produce a urea formaldehyde molding composition which consists in blowing air or other inert gas through a sieve on which is placed a solution of a urea-formaldehyde condensate reacted at least to the methylol urea stage, but to an insufficient degree to change the viscosity of the solution to any substantial extent, said solution being in admixture with supporting substances, such substances acting both to form a porous material permitting the passage of a gas during the drying process and also acting as a suitable filler for the molded product.

16. The process of manufacturing fusible urea-formaldehyde condensation products which comprises subjecting a solution of dimethylol urea to a drying operation in the presence of an acid catalyst, said drying operation serving simultaneously to advance the condensation reaction at a rate which removes most of the water present before polymerization begins and solidification occurs.

17. The process of producing fusible urea-formaldehyde condensation products which comprises reacting aqueous formaldehyde and urea in the molar proportion of 2 of the former to more than 1.05 of the latter under an acid pH value above 4, thereby forming methylol urea in solution, continuing the condensation reaction but before any substantial polymerization occurs evaporating off the water present in the presence of an acid catalyst, said acid catalyst serving to advance the reaction and hence to liberate water of the condensation reaction.

LEONARD SMIDTH.

CERTIFICATE OF CORRECTION.

Patent No. 2,140,561.                                               December 20, 1938.

LEONARD SMIDTH.

It is hereby certified that error appears in the printed specification of the above numbered patent requiring correction as follows: Page 3, first column, line 5, for "1.5 moles of urea with 1 mole" read  1 mole of urea with 1.5 mole; and that the said Letters Patent should be read with this correction therein that the same may conform to the record of the case in the Patent Office.

Signed and sealed this 18th day of April, A. D. 1939.

Henry Van Arsdale (Seal)                                                      Acting Commissioner of Patents.